Figures 1, 2:
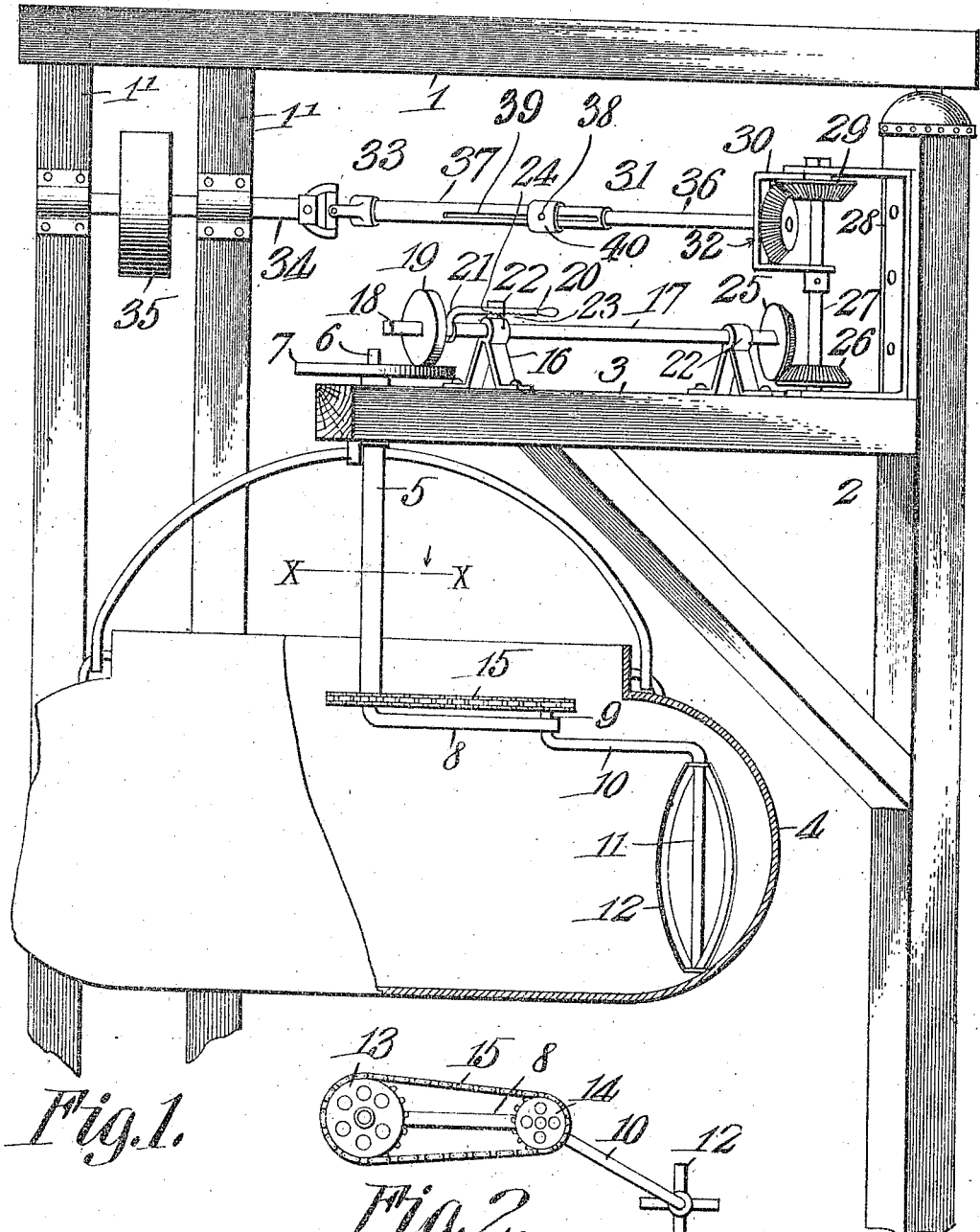

O. H. MOLDENHAUER.
CHEESE STIRRER.
APPLICATION FILED JUNE 5, 1908. RENEWED JAN. 7, 1910.

948,933.

Patented Feb. 8, 1910.

Witnesses

Inventor
Oscar H. Moldenhauer,
By Cashow & Co.
Attorneys

UNITED STATES PATENT OFFICE.

OSCAR HENRY MOLDENHAUER, OF JUDA, WISCONSIN.

CHEESE-STIRRER.

948,933.  Specification of Letters Patent.  Patented Feb. 8, 1910.

Application filed June 5, 1908, Serial No. 436,912. Renewed January 7, 1910. Serial No. 536,926.

*To all whom it may concern:*

Be it known that I, OSCAR HENRY MOLDENHAUER, a citizen of the United States, residing at Juda, in the county of Green and State of Wisconsin, have invented a new and useful Cheese-Stirrer, of which the following is a specification.

This invention relates to stirring apparatus, and has especial reference to stirring apparatus used in the manufacture of cheese.

The invention has for its object to provide an improved apparatus of this kind by means of which the contents of a kettle will be thoroughly and effectively stirred, over and across the entire bottom of the kettle.

The invention consists of a stirring apparatus of the character referred to, constructed and arranged as hereinafter set forth and claimed.

Referring to the drawing, Figure 1 is a view in elevation of an embodiment of the invention, a part of the kettle being broken away. Fig. 2 is a detail plan view of a part of the stirring mechanism on the line $x$—$x$ Fig. 1.

In carrying out the invention a frame work 1, is provided in which is mounted a crane 2, from the swinging arm 3 of which is suspended a kettle 4. The stirring mechanism consists of a tubular arm or sleeve 5 depending from the outer end of the arm 3 into the kettle 4, and having its upper end extending through, and fixed to the end of arm 3. Extending through the tubular arm 5 is a rotary shaft 6 having a horizontal disk wheel 7 mounted on its upper end and formed at its lower end with a laterally extending arm 8 in the outer end of which is journaled the vertical bent portion 9 of a horizontally swinging arm 10, having at its outer end a depending arm 11 supporting the stirrer 12 adjacent to the side and bottom of the kettle 4. Upon the lower end of the tubular arm 5 is mounted a fixed sprocket wheel 13, and on the vertical portion 9 of arm 10 is mounted a sprocket wheel 14, connected with the sprocket wheel 13 by an endless chain 15. By means of the foregoing mechanism, when the shaft 6 is rotated, the arm 8 will be swung in a circle about the axis of shaft 6, and by this movement will cause the sprocket wheel 14 to turn, owing to its connection by chain 15 with sprocket wheel 13. The wheel 14 being thus caused to turn will swing the arm 10 in a circle about the axis of the vertical portion 9, carrying with it the stirrer on arm 11. In these two movements of the arms 8, and 10 the stirrer will be moved in a succession of circles over the bottom of the kettle between its center and its sides throughout the circumference of the kettle, thereby thoroughly and effectively stirring all of the contents of the kettle extending over its bottom.

Any suitable mechanism may be used to operate the stirring mechanism, and preferably the following is employed. Mounted in brackets 16 on the arm 3 is a shaft 17 having mounted on its outer end 18 a friction disk 19 which rests on disk wheel 7 and imparts rotary motion thereto. To change the speed of disk wheel 7 and thereby impart greater or less movement to the stirring mechanism, the friction disk 19 is made adjustable on the outer end of shaft 17. This is done as here shown, preferably by making the end 18 of shaft 17 square and having the disk 19 slidable thereon, the adjustment being effected by means of a handle 20 having a forked end 21 engaging a collar 22 on the disk 19. The handle 20 is held in adjusted position by means of a rack 23 engaging a tooth or projection 24 on the bracket 16. The shaft 17 is operated by a bevel gear wheel 25 on its inner end, which meshes with a bevel gear wheel 26 on the lower end of a vertical shaft 27 mounted in a bracket 28 on the upper end of the crane 2. On the upper end of shaft 27 is a bevel gear wheel 29 which meshes with a bevel gear wheel 30 on one end of a shaft 31 mounted in a bracket 32, swinging on the shaft 27 the other end of shaft 31 being connected by a universal joint 33 with a shaft 34 mounted in the uprights 1' of the frame 1, and carrying a driving pulley 35. In order to accommodate the shaft 31 to the swinging movement of the arm 3 of the crane when it is moved to shift the kettle to different positions, the shaft 31 is made adjustable, the shaft 31 being formed with a section 36 which projects into and is slidable in a sleeved section 37, the section 36 having lateral pins 38 which project through slots 39 in the sides of the section 37, and are connected with a sleeve 40, which is slidable on the sleeve section 37. By means of the adjustable shaft 31, connected by the universal joint 33 with the shaft 34, the driving mechanism is automatically adjusted to the swinging movement of the crane.

Where a crane is not used, the driving and bevel gear mechanism is dispensed with and the shaft 17 is directly connected with any suitable driving mechanism.

Having described the invention, I claim:

1. In a stirring mechanism a support, a revolving stirrer depending therefrom and having a shaft passed through the support, a bracket fixed upon the support, a shaft journaled in the bracket, means for rotating the last said shaft, a variable speed mechanism operatively connecting the said shafts together, and an operating handle for the variable speed mechanism having ratchet and tooth engagement with the bracket.

2. In a stirring mechanism a support, a revolving stirrer depending therefrom and having a shaft passing through the support, a bracket fixed upon the support, a shaft journaled in the bracket, means for rotating the last said shaft, and a variable speed mechanism operatively connecting the shafts together, and located above the stirrer and between the stirrer and the stirrer shaft.

In testimony that I claim the foregoing as my own, I have hereto affixed my signature in the presence of two witnesses.

OSCAR HENRY MOLDENHAUER.

Witnesses:
A. S. MATZKE,
J. F. MILLER.